US010226860B2

(12) United States Patent
Rampton (10) Patent No.: US 10,226,860 B2
(45) Date of Patent: Mar. 12, 2019

(54) ENHANCED ACTION HAND TOOL SYSTEM (71) Applicant: Sean Rampton, Midvale, UT (US)

(72) Inventor: Sean Rampton, Midvale, UT (US)

(*) Notice: Subject to any disclaimer, the term of this patent is extended or adjusted under 35 U.S.C. 154(b) by 0 days.

(21) Appl. No.: 15/470,759

(22) Filed: Mar. 27, 2017

(65) Prior Publication Data
US 2017/0297190 A1 Oct. 19, 2017

Related U.S. Application Data (60) Provisional application No. 62/313,577, filed on Mar. 25, 2016.

(51) Int. Cl.
B25G 1/01 (2006.01)
A46B 15/00 (2006.01)
A47L 13/11 (2006.01)
A47L 13/022 (2006.01)
A47L 13/12 (2006.01)
A47L 13/42 (2006.01)
A01B 1/22 (2006.01)
B25G 1/04 (2006.01)
B25G 3/18 (2006.01)
A01B 1/02 (2006.01)
A01B 1/06 (2006.01)
(Continued)

(52) U.S. Cl.
CPC ............ B25G 1/01 (2013.01); A01B 1/22 (2013.01); A01B 1/227 (2013.01); A46B 15/0081 (2013.01); A47L 13/022 (2013.01); A47L 13/11 (2013.01); A47L 13/12 (2013.01); A47L 13/42 (2013.01); B25G 1/04 (2013.01); B25G 3/18 (2013.01); A01B 1/02 (2013.01); A01B 1/06 (2013.01); A01D 7/00 (2013.01); A01D 9/00 (2013.01); A01D 11/06 (2013.01); A46B 2200/302 (2013.01)

(58) Field of Classification Search
CPC .. B25G 3/02; B25G 1/01; A47L 13/12; A47L 13/022; A47L 13/42; A47L 13/11; A01D 11/06; A01D 7/00; A01D 9/00; A01B 1/227; A01B 1/02; A01B 1/06; A46B 15/0081; A46B 2200/302
See application file for complete search history.

(56) References Cited

U.S. PATENT DOCUMENTS 1,555,630 A   2/1925  Brock
1,674,983 A   6/1928  Morton
(Continued)

FOREIGN PATENT DOCUMENTS

DE   19930778       7/1999
GB     424412   *   2/1935
GB     561688   *   5/1944

Primary Examiner — Stephen A Vu
(74) Attorney, Agent, or Firm — Thorpe North & Western, LLP (57) ABSTRACT A cleaning implement is described, which can have an elongate handle with a proximal end, a distal end, and an interior surface. The interior surface of the elongate handle can define an interior cavity of the elongate handle. An elastic element can be secured within the interior cavity of the handle at the proximal end. A motion rod can also be concentrically secured within the interior cavity of the handle, adjacent to the elastic element. The motion rod can have an exposed end protruding out of the elongate handle at the distal end, and the exposed end can have a tip with a tool attachment feature.

23 Claims, 7 Drawing Sheets (51) Int. Cl.
  *A01D 7/00* (2006.01)
  *A01D 9/00* (2006.01)
  *A01D 11/06* (2006.01)

(56) References Cited

U.S. PATENT DOCUMENTS

| | | |
|---|---|---|
| 1,895,229 A | 1/1933 | Morton |
| 2,043,758 A | 6/1936 | Lay |
| 2,116,375 A | 5/1938 | Aubitz |
| 2,268,488 A | 12/1941 | Keeys |
| 2,871,016 A * | 1/1959 | Rapaport ............... A63B 25/08 267/33 |
| 3,016,556 A | 1/1962 | Greenleaf |
| 3,246,895 A | 4/1966 | Traill |
| 3,773,320 A | 11/1973 | Samiran et al. |
| 4,785,489 A | 11/1988 | Von Doehren et al. |
| 5,384,930 A | 1/1995 | Uno |
| 6,718,589 B2 | 4/2004 | Kimbro |
| 7,387,054 B2 * | 6/2008 | Rajotte ................ B25B 15/001 279/75 |
| 8,191,267 B2 * | 6/2012 | Patel ........................ B25G 3/18 30/339 |
| 9,073,198 B1 | 7/2015 | Menius |
| 2015/0030331 A1 * | 1/2015 | Salsi .................... H04B 10/614 398/65 |

\* cited by examiner

ENHANCED ACTION HAND TOOL SYSTEM

RELATED APPLICATIONS

This application claims the benefit of U.S. Provisional Application Ser. No. 62/313,577, filed on Mar. 25, 2016, which is incorporated herein by reference.

BACKGROUND

Clearing floors of debris constitutes a ubiquitous effort by mankind to increase order and cleanliness in a variety of circumstances. Domestic and commercial floor clearing is most often accomplished using vacuum cleaners and brooms. Brooms and sweepers have long and anciently exhibited a basic design including an extended handle with an assembly of flexible brush fibers affixed to an opposing end. Although minor variations and improvements have sought to improve strength and performance of brooms, such improvements are relatively modest and tend to result in unimpressive increases in performance.

SUMMARY

A cleaning implement is described herein having enhanced action. The cleaning implement can have an elongate handle with a proximal end, a distal end, and an interior surface. The interior surface of the elongate handle can define an interior cavity of the elongate handle. An elastic element can be secured within the interior cavity of the handle at the proximal end. A motion rod can also be concentrically secured within the interior cavity of the handle, adjacent to the elastic element. The motion rod can have an exposed end protruding out of the elongate handle at the distal end, and the exposed end can have a tip with a tool attachment feature.

In some examples, the elongate handle can be a circular tube. Although other dimensions can be suitable, in one example the elongate handle can have a diameter of from 1.27 cm to 7.62 cm and a length of from 45.7 cm to 101.6 cm.

The cleaning implement can also include an end cap enclosing the interior cavity at the proximal end of the elongate handle. In some examples, the elastic element can be coupled to the end cap. In some examples, the cleaning implement can consist of the elongate handle, the end cap, the elastic element, the motion rod, and an optional label.

The elastic element can include or can be a member selected from the group consisting of a spring, a pneumatic piston, a hydraulic piston, an elastomer, and combinations thereof. In some examples, the elastic element can be an elastically compressible element. In some examples, the elastic element can be an elastically extensible element.

The cleaning implement can also include a guide washer coupled to the elongate handle at the distal end and oriented to space the motion rod and the elongate handle from one another proximate the distal end. In some examples, the motion rod can have a fit tolerance within the guide washer of from 0.005 mm to 0.1 mm, and in some cases about 0.015 mm.

In some examples, the motion rod can also be a circular tube. The motion rod have a length of from 45.7 cm to 101.6 cm, although other lengths may be suitable. In some examples, the motion rod is coupled to the elastic element.

In some examples, the tool attachment feature can be a feature selected from the group consisting of a threaded feature, a cam-lock feature, a locking detent feature, and combinations thereof. In some examples, the tool attachment feature can be a quick-release attachment feature. In some examples, a tool can be operatively coupled to the cleaning implement via the tool attachment feature of the tip. The tool can include or can be a member selected from the group consisting of a broom, a brush, a squeegee, a scraper, a shovel, a rake, a hoe, a pitch fork, and combinations thereof.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used.

The singular forms "a," "an," and "the" include plural referents unless the context clearly dictates otherwise. Thus, for example, reference to "a rod" includes reference to one or more of such materials and reference to "engaging" refers to one or more such steps.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, the term "at least one of" is intended to be synonymous with "one or more of" For example, "at least one of A, B and C" explicitly includes only A, only B, only C, and combinations of each (e.g. A+B, B+C, A+C, and A+B+C).

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Enhanced Action Sweeper

Figure 1A:
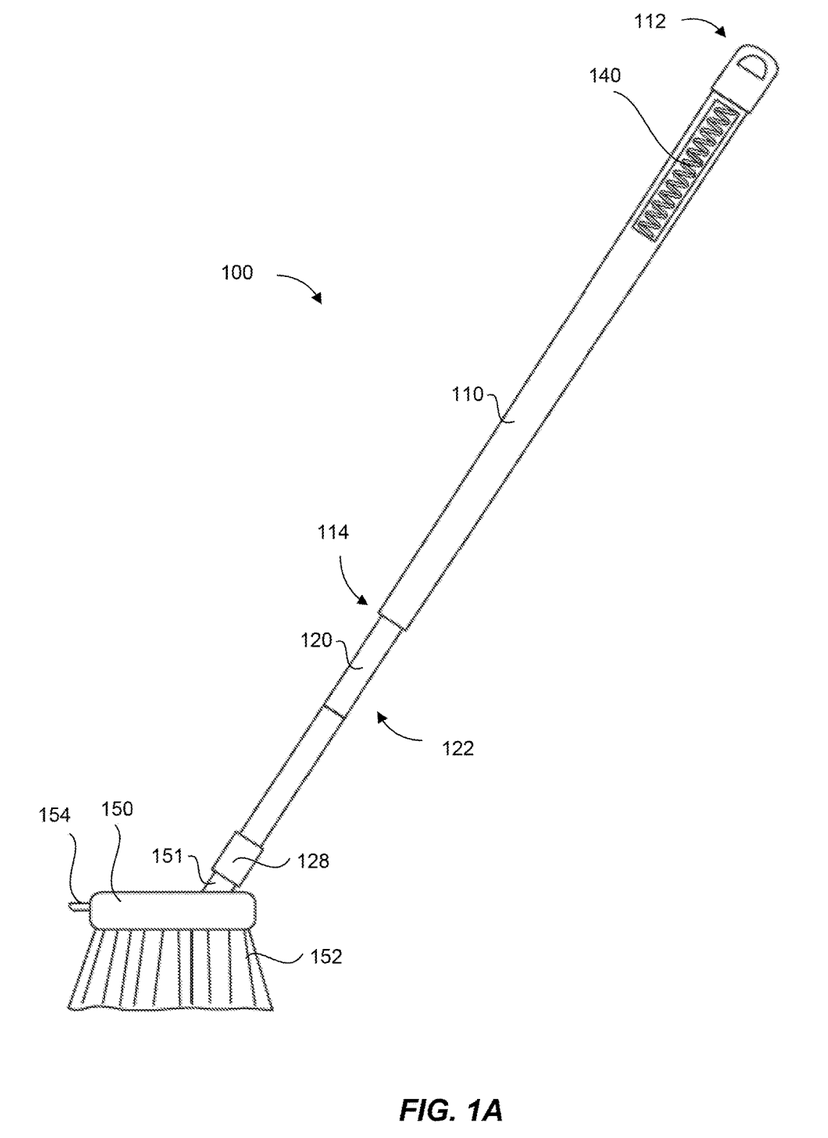
FIG. 1A illustrates a profile view of a cleaning implement, in accordance with some examples of the current disclosure.
Figure 1B:
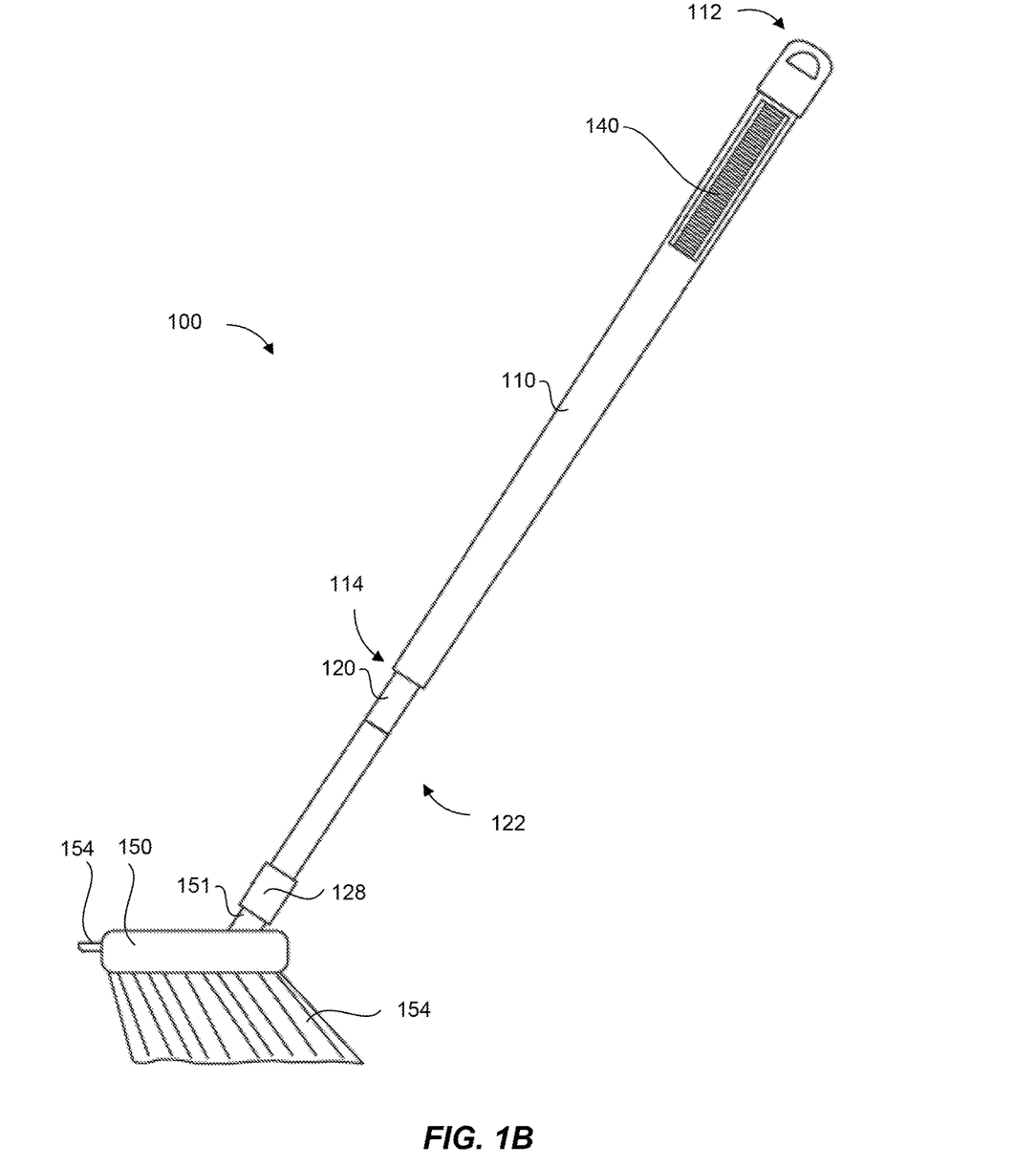
FIG. 1B illustrates a profile view of the cleaning implement of FIG. 1A, in an engaged configuration.
Figure 2A:
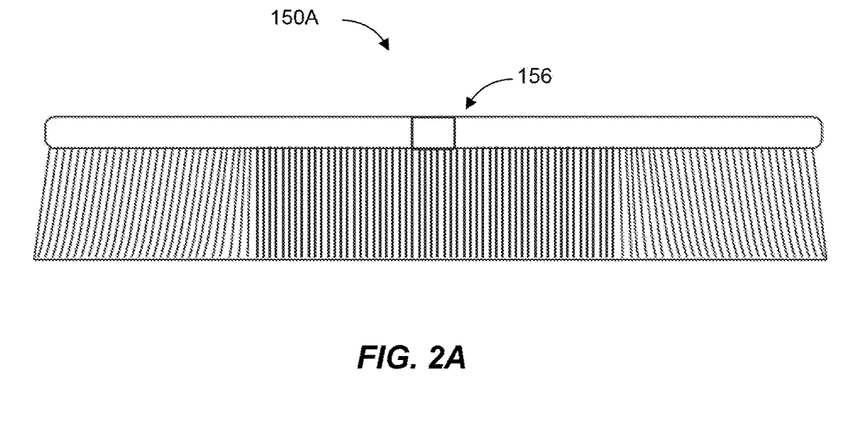
FIG. 2A illustrates a rear view of a broom, in accordance with some examples of the current disclosure.
Figure 2B:
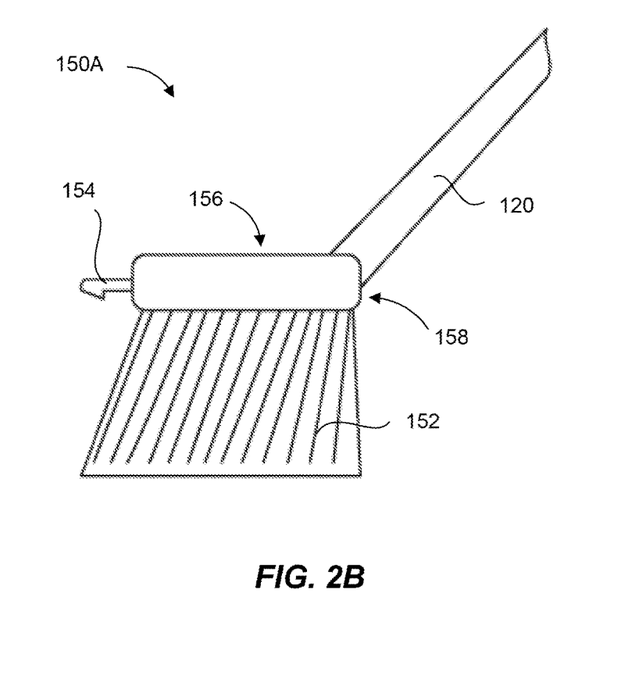
FIG. 2B illustrates a profile view of a broom/squeegee tool operatively coupled to a cleaning implement, in accordance with some examples of the current disclosure.

A cleaning implement is described herein that can provide a number of advantages due to its enhanced action. The enhanced action of an embodiment of the cleaning implement is illustrated in FIGS. 1A-1B. As a brief overview, the cleaning implement 100 can have an elongate handle 110 with a proximal end 112, a distal end 114, and an interior surface (not shown). The interior surface can define an interior cavity of the elongate handle 110. An elastic element 140, which can be elastically compressible and/or extensible, can be secured within the interior cavity of the elongate handle 110 at the proximal end 112. Additionally, a motion rod 120 can be concentrically secured within the interior cavity of the elongate handle 110. The motion rod can be adjacent to and operably associated with the elastic element 140. Further, the motion rod 120 can have an exposed end 122 protruding out of the elongate handle 110 at the distal end 114 having a tip with a tool attachment feature 128. A cleaning tool, such as broom or brush 150, can be attached at the tip via the tool attachment feature 128. As illustrated in FIG. 1A, the cleaning tool 150 can optionally include a stem 151 extending therefrom to facilitate attachment of the cleaning tool 150 to the attachment feature 128. In other examples, as illustrated in FIGS. 2A-2B, the tip and associated attachment feature of the cleaning implement can be directly attached to the cleaning tool without the use of an intermediary stem coupled to the cleaning tool.

With this basic structure in mind, FIG. 1A illustrates the cleaning implement 100 in a relaxed configuration where an elastic element 140 that is elastically compressible is in an uncompressed state. However, as illustrated in FIG. 1B, when the cleaning implement is compelled forward with the tool 150 engaging a floor surface, friction between the tool 150 and the surface will drive the motion rod 120 further into the elongate handle 110, compressing the elastically compressible element 140. A number of factors can determine the extent to which the elastically compressible element becomes compressed and the amount of mechanical energy stored therein. Such factors can include the amount of force used to compel the cleaning implement forward, the distance over which the cleaning implement is compelled, the degree of friction between the tool and the surface, etc. Once compressed, the elastically compressible element 140 can remain in a compressed state until the force against the elastically compressible element 140 is insufficient to maintain the achieved degree of compression. At that time, the elastically compressible element 140 will begin to decompress to a relaxed state, driving the motion rod 120 forward to its relaxed position, as illustrated in FIG. 1A. Thus, as the elastically compressible element rapidly decompresses and releases the mechanical energy stored therein, an enhanced action of the cleaning implement is generated that can compel dirt, debris, water, other liquids, and the like, forward to a greater extent than a standard cleaning implement.

As one specific example, where the elastically compressible element is an 8" compression spring, the elastically compressible element can be compressed to release over 18 pounds of outward force. This enhanced action can lead to shorter and more efficient clean-up periods for a variety of cleaning projects, as will be apparent to one skilled in the art.

Similarly, in other examples, the elastic element can be an elastically extensible element. This can be desirable in such cases where a cleaning tool such as a rake, hoe, or the like is used. In such examples, when the cleaning implement is compelled backward with the tool engaging a surface, friction between the tool and the surface will extend the motion rod further out of the elongate handle, extending the elastically extensible element. Once extended, the elastically extensible element can remain in an extended state until the force against the elastically extensible element is insufficient to maintain the achieved degree of extension. At that time, the elastically extensible element will begin to recompress to a relaxed state, pulling the motion rod backward to its relaxed position. Thus, as the elastically extensible element rapidly recompresses and releases the mechanical energy stored therein, an enhanced action of the cleaning implement is generated that can compel dirt, debris, water, other liquids, and the like, backward to a greater extent than a standard cleaning implement.

As such, the cleaning implement 100 can be used with a number of cleaning tools, such as cleaning tool 150, which has both a brush portion 152 and an optional squeegee portion 154. A similar cleaning tool 150A is further illustrated in FIGS. 2A-2B. FIG. 2A illustrates a rear view of cleaning tool 150A. FIG. 2B illustrates a profile view of the cleaning tool 150A. In contrast to tool 150, which has an attachment point, via an optional stem 151, disposed entirely in the top surface, the tool 150A has an attachment point, such as a slot or hole, disposed between the top surface 156 and the back surface 158 to attach to the cleaning implement at a position where it engages both the top surface 156 and the rear surface 158 of the tool. Any other suitable attachment configuration can also be used. Non-limiting examples of attachment configurations can include metal braces, groove and slot, interference fittings, threaded engagement, and the like.

Figure 2C:
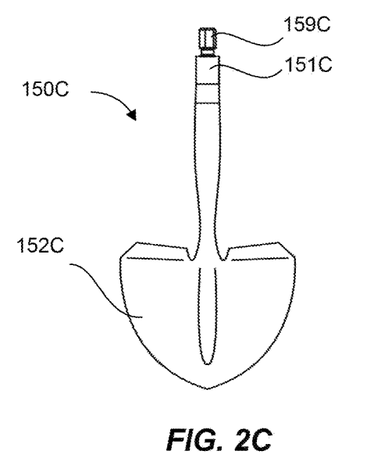
FIG. 2C illustrates a front view of a round point shovel, in accordance with examples of the current disclosure.
Figure 2D:
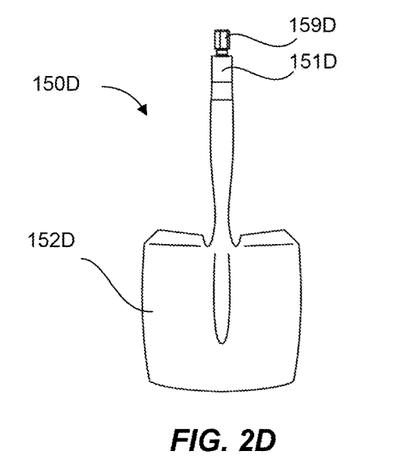
FIG. 2D illustrates a front view of a square point shovel, in accordance with examples of the current disclosure.
Figure 2E:
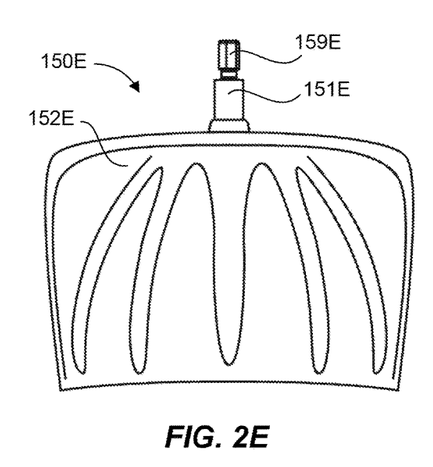
FIG. 2E illustrates a front view of a scoop shovel, in accordance with examples of the current disclosure.
Figure 2F:
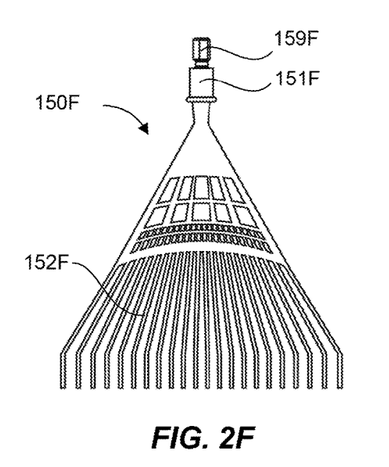
FIG. 2F illustrates a front view of a rake, in accordance with examples of the current disclosure.

As illustrated in FIG. 2B, tool 150A can also have both a brush portion 152 and a squeegee portion 154. This can allow the cleaning implement to be used for both dry and wet cleaning projects without having to exchange the tool. A number of other dual purpose tools can also be used. However, the tool need not be a dual purpose tool. Some additional, non-limiting tools for attachment to the cleaning implement are illustrated in FIGS. 2C-2F. More specifically, FIG. 2C illustrates a round point shovel 150C having a shovel blade 152C, a stem 151C to facilitate attachment to the cleaning implement, and an attachment fitting 159C adapted to mate with the attachment feature of the cleaning implement. FIG. 2D illustrates a square point shovel 150D having a shovel blade 152D, a stem 151D to facilitate attachment to the cleaning implement, and an attachment fitting 159D adapted to mate with the attachment feature of the cleaning implement. FIG. 2E illustrates a snow shovel or scoop 150E having a shovel blade 152E, a stem 151E to facilitate attachment to the cleaning implement, and an attachment fitting 159E adapted to mate with the attachment feature of the cleaning implement. FIG. 2F illustrates a rake 150F having a plurality of tines 152F, a stem 151F to facilitate attachment to the cleaning implement, and an attachment fitting 159F adapted to mate with the attachment feature of the cleaning implement. Thus, a variety of tools can be attached to the cleaning implement as described herein. For example, the tool can be a broom, a brush, a squeegee, a scraper, a shovel, a rake, a hoe, a pitch fork, or the like, either alone or in combination, as desirable.

Figure 3A:
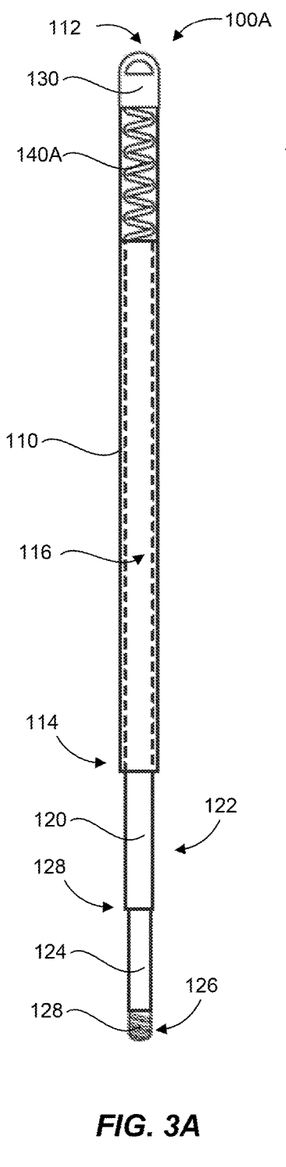
FIG. 3A illustrates a profile view of a cleaning implement wherein the elastic element is a spring, in accordance with some examples of the current disclosure.
Figure 3B:
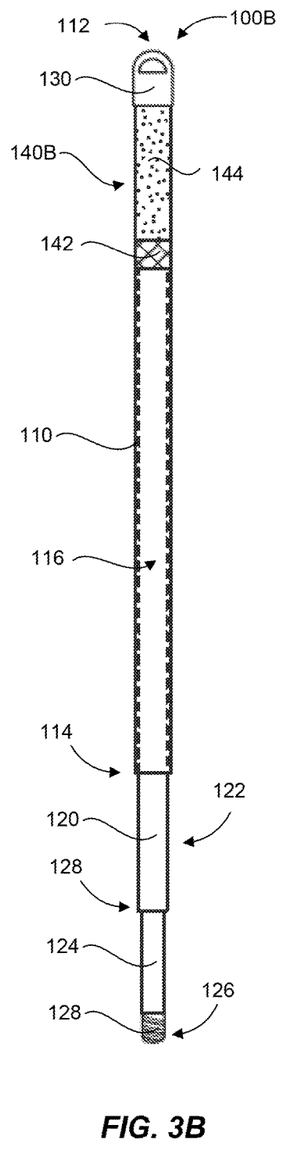
FIG. 3B illustrates a profile view of a cleaning implement wherein the elastic element is a hydraulic or pneumatic piston, in accordance with some examples of the current disclosure.
Figure 3C:
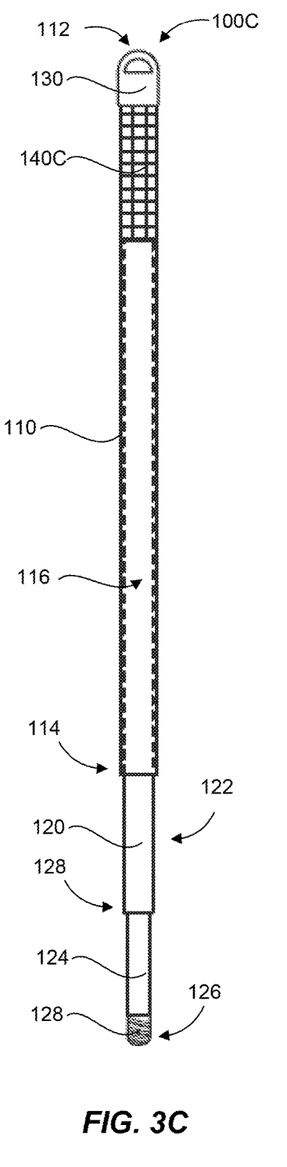
FIG. 3C illustrates a profile view of a cleaning implement wherein the elastic element is an elastomer, in accordance with some examples of the current disclosure.

FIGS. 3A-3C illustrate a number of embodiments of enhanced action cleaning implements that can be attached to a cleaning tool, such as those listed above. As previously described, the enhanced action cleaning implement can have an elongate handle 110. The elongate handle can have a number of suitable ergonomic geometries. For example, the geometry of the elongate handle can be circular, ovular, polygonal, the like, or a combination thereof. In one specific example, the elongate handle can be a circular tube, such as a circular tube having a tube gauge thickness of from about 0.1 mm to about 1 mm, or other suitable thickness.

The elongate handle can also have a number of suitable diameters and lengths. In some examples, the elongate handle can have a diameter of from about 1 cm to about 8 cm, from 1.27 cm to 7.62 cm, or from about 2 cm to about 5 cm or about 6 cm. Other suitable diameters can also be used. Further, in some examples, the elongate handle can have a length of from 45.7 cm to 101.6 cm. However, other suitable lengths can also be used.

The elongate handle can also be made of number of suitable materials. In some examples, the elongate handle can be made of a metal or metal alloy. Non-limiting examples can include aluminum, steel, or the like. In other examples, the elongate handle can be made of a polymeric material, such as fiberglass, polypropylene, polyethylene, the like, or combinations thereof. In some examples, the handle can be fully and/or partially coated with a plastic, paint, a label, other coating, or combinations thereof.

The elongate handle 110 can have an opening at both the proximal end 112 and the distal end 114, or just at the distal end 114. Where the elongate handle 110 includes an opening at the proximal end 112, an end cap, such as end cap 130, can be used to enclose, or at least partially enclose, the interior cavity 116 at the proximal end 112 of the elongate handle 110. Although the elongate handle can have any suitable length, typically the length is sufficient to allow a user to grasp along the elongate handle during use and avoid inadvertent pinching near an interface with the motion rod 120. As a general guideline, the elongate handle 110 can have a length from 40 cm to 110 cm.

The end cap 130 can attach to the elongate handle 110 in a variety of ways. Non-limiting examples of attachment mechanisms can include threads, cam locks, locking detents, friction fitting, pins, screws, clamps, clips, or combinations thereof. Further, the end cap can be made of variety of suitable materials, such as a metallic or polymeric material. While the end cap 130 is illustrated as interfacing with an exterior surface of the elongate handle 110, in other examples the end cap can interface with the interior surface of the elongate handle. In some further examples, the end cap 130 can be part of a hand grip, such as a D-shaped or T-shaped grip, for example, that is positioned at the proximal end 112 of the elongate handle 110.

In some examples, the elastic element, which can be elastically compressible and/or extensible, can be coupled to the end cap and/or the elongate handle 110. In some examples, the elastic element can have adjustable compressibility or extensibility, such as an adjustable compression spring or extension spring. In some examples, where the elastic element has adjustable compressibility and/or extensibility, the elastic element can be operatively associated with the end cap. For example, the elastic element can be associated with the end cap such that a user can rotate the end cap to adjust the compressibility and/or extensibility of the elastic element. In other examples, an adjustment dial, lever, or other feature can extend through the end cap to be directly operable by a user without rotating or otherwise manipulating the endcap. However, the compressibility and/or extensibility of the elastic element need not be adjustable.

As illustrated in FIGS. 3A-3C, a number of different elastic elements can be used. For example, the elastic element can include or can be a member selected from the group consisting of a spring, a pneumatic piston, a hydraulic piston, an elastomer, and combinations thereof. As a specific example, FIG. 3A illustrates a cleaning implement 100A employing elastic element 140A, as a compressible and/or extensbile spring. Although other dimensions can be suitable, the spring can have an outside diameter from 0.05 to 5.5 cm, and a length from 7.62 to 41 cm. Alternatively, FIG. 3B illustrates cleaning implement 100B incorporating elastic element 140B, as a hydraulic or pneumatic piston 142 operably associated with a compressible fluid 144. In yet another example, FIG. 3C illustrates cleaning implement 100C employing elastic element 140C, a compressible and/or extensible elastomeric material.

As previously discussed, the motion rod 120 can be concentrically secured within the interior cavity 116 of the elongate handle 110 adjacent to and operatively associated with the elastic element. The motion rod 120 can be secured within the interior cavity 116 of the elongate handle 110 in a variety of ways. In some examples, the motion rod 120 can be attached to the elastic element, such as spring 140A, piston 142, elastomer 140C, or other elastic element. In some examples, the elongate handle 110 can have a cut or groove formed along a portion thereof and the motion rod 120 can include a pin, screw, protrusion, or the like, that is configured to engage and slide along the cut or groove to allow the motion rod to be slidably secured within the interior cavity of the elongate handle. Other suitable methods of securing the motion rod 120 within the interior cavity 116 of the elongate handle 110 can also be used.

The motion rod can have a similar or equivalent geometry as the elongate handle and can be made of the same or similar materials as the elongate handle. For example, the motion rod can also be a circular tube, such as a circular tube having a tube gauge thickness of from about 0.1 mm to about 1 mm, or other suitable thickness. However, while in some embodiments it can be advantageous for the motion rod to be hollow, it need not be. The diameter of the motion rod can be slightly smaller than that of the elongate handle, such as from 0.63 cm to 7.62 cm. The motion rod can have a variety of suitable lengths, such as from 45.7 cm to 101.6 cm. As will be discussed in more detail below, in some examples, the motion rod can have a telescoping portion 124, which can increase the length of the motion rod beyond the range listed above, or beyond another suitable base length.

As can be seen in FIGS. 3A-3C, the motion rod 120 can have an exposed end 122 protruding out of the elongate handle 110 at the distal end 114. In some examples, the elongate handle 110 can be fitted with a guide washer at the distal end 114 to stabilize the exposed end 122 of the motion rod 120 and reduce rubbing between the elongate handle 110 and the motion rod 120. The guide washer can be oriented to space the motion rod 120 and the elongate handle 110 from one another at or proximate to the distal end 114. In some examples, the motion rod 120 can have a fit tolerance within the guide washer of from 0.005 mm to 0.1 mm, and in some cases about 0.015 mm, or other suitable fit tolerance.

Figure 4A:
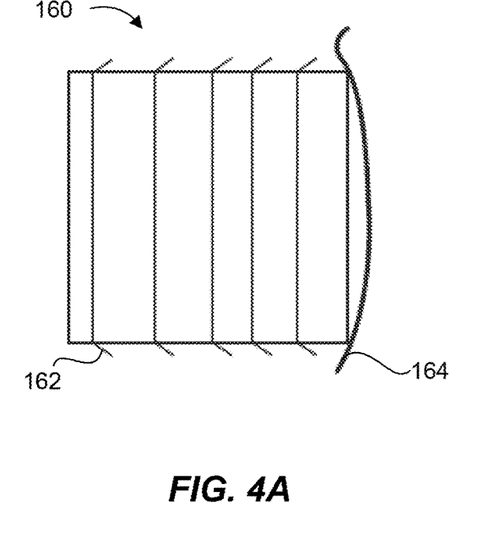
FIG. 4A illustrates a profile view of a guide washer, in accordance with some examples of the current disclosure.
Figure 4B:
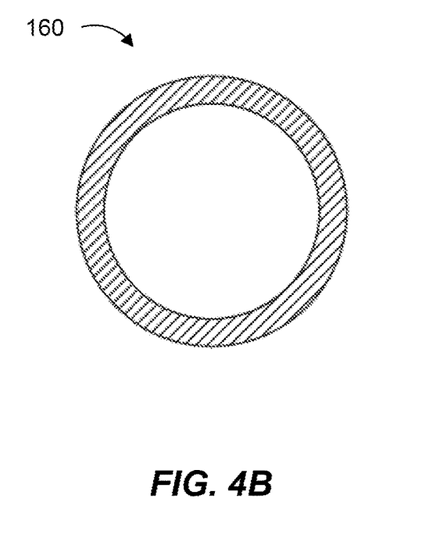
FIG. 4B illustrates a cross-sectional top view of a guide washer, in accordance with some examples of the current disclosure.

One example of a guide washer 160 is illustrated in FIGS. 4A-4B. In this particular example, the guide washer 160 includes a plurality of flanges or ridges 162 to engage an interior surface of the elongate handle to form a friction fit between the guide washer 160 and the elongate handle. The guide washer 160 further includes a lip 164 to engage the elongate handle at the distal end 114 to prevent the guide washer 160 from being entirely disposed within the interior cavity of the elongate handle. A variety of other guide washers can also be used having alternative attachment features, such as threads, cam-locks, locking detents, compression rings, and the like.

Figure 5A:
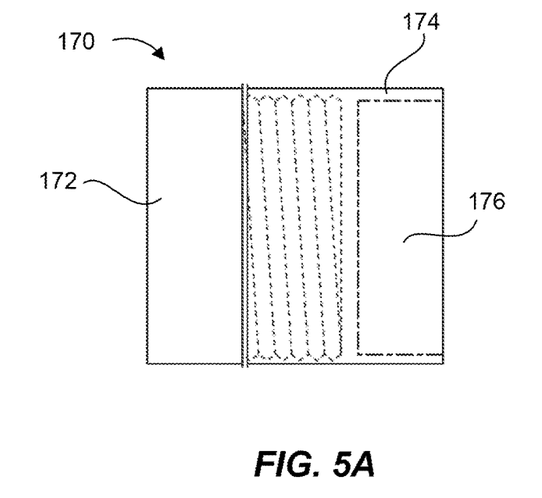
FIG. 5A illustrates a cross-sectional profile view of a twist-lock guide washer, in accordance with some examples of the current disclosure.
Figure 5B:
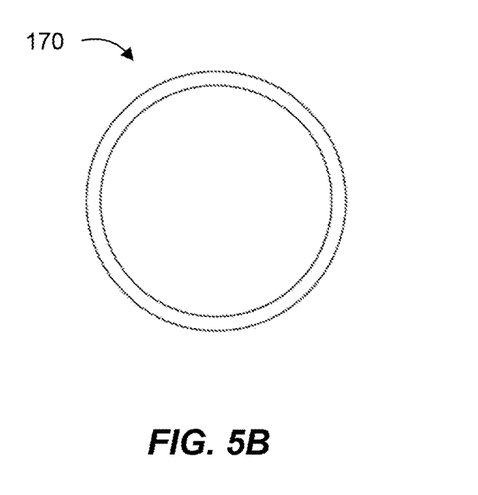
FIG. 5B illustrates a top view of a twist-lock guide washer, in accordance with some examples of the current disclosure.

Returning again to FIGS. 3A-3C, whether or not a guide washer is used with the cleaning implement, the exposed end 122 of the motion rod 120 can have a telescoping or non-telescoping end. Where the exposed end 122 includes a telescoping portion 124, a twist-lock guide washer or other telescoping securement feature can be positioned at location 128. One example of a twist-lock guide washer 170 is illustrated in FIGS. 5A and 5B. The twist-lock guide washer can include a fixed portion 172 having a male attachment feature, such as threads, and a nut portion 174 having a female attachment feature. The fixed portion 172 can be attached to the non-telescoping segment of the motion rod at the junction between the telescoping and non-telescoping segments.

As illustrated in FIG. 5A, a compressible ring 176, or the like, can be disposed within the nut portion 174 so as to be positioned around the telescoping segment of the motion rod. Thus, as the nut portion 174 is tightened against fixed portion 172, the compressible ring 176 will be compressed between an inside surface of the nut portion 174 and the exterior surface of the telescoping segment of the motion rod to secure the telescoping segment at a desired position. Other embodiments of twist-lock guide washers, compression-lock guide washers, or other locking guide washers can likewise be used.

Returning again to FIGS. 3A-3C, whether or not the motion rod 120 has a telescoping segment 124 or not, the exposed end 122 of the motion rod 120 can have a tip 126 with a tool attachment feature 128 to attach a suitable cleaning tool, such as those described above. While tip 126 is illustrated as having a threaded attachment feature 128, other attachment features can also be used. Further, in some examples, the attachment feature can be a male fitting that is adapted to mate with a female fitting on a tool. In other examples, the attachment feature can be a female fitting that is adapted to mate with a male fitting on a tool. In some examples, the tool attachment feature can be a feature selected from the group consisting of a threaded feature, a cam-lock feature, a locking detent feature, a pin hole, a screw slot, and combinations thereof. In some further examples, the tool attachment feature can be a quick-release attachment feature. Where this is the case, the quick-release attachment feature can be a latching or non-latching quick-release attachment feature. In some examples, the quick-release attachment feature can be a latching quick-release attachment feature. For example, in some cases, the latching quick-release attachment feature can include a female quick-release fitting having a spring-loaded ball, ring, pin, or other latching mechanism that is adapted to automatically engage a corresponding groove, slot, hole, or other catch of a male quick-release fitting when the female quick-release fitting and the male quick-release fitting are connected. The quick-release fitting can include a retractable sleeve, a button, or other suitable release mechanism to disengage the latching mechanism to permit the male quick-release fitting and the female quick-release fitting to be quickly and easily separated.

Figure 6:
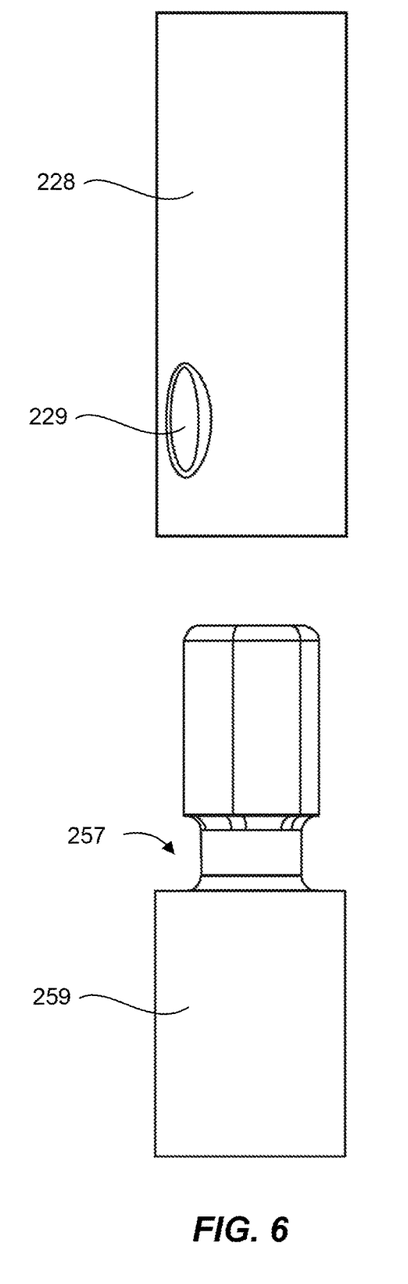
FIG. 6 illustrates a top view of a quick-release attachment feature, in accordance with some examples of the current disclosure.

One non-limiting example of a quick-release attachment feature 228 is illustrated in FIG. 6. In this particular example, the quick-release attachment feature 228 is a female quick release attachment feature that is adapted to mate with a corresponding male attachment fitting 259. The quick-release attachment feature 228 can include any suitable latching mechanism (not shown), such as a ball, ring, pin, the like, or combinations thereof The latching mechanism can be adapted to automatically engage a groove 257 of the male attachment fitting 259 when the quick-release attachment feature 228 is connected with the attachment fitting 259. A button 229, or other suitable release mechanism, can disengage the latching mechanism of the quick-release attachment feature 228 from the groove 257 of the attachment fitting 259 to allow the quick-release attachment feature 228 to become immediately separable from the attachment fitting 259. Other suitable quick-release attachment feature can likewise be used, as desired.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. A cleaning implement, comprising:
    an elongate handle having a proximal end, a distal end, and an interior surface, the interior surface defining an interior cavity;
    an elastic element secured within the interior cavity of the handle at the proximal end of the handle; and
    a motion rod concentrically and slidably secured within the interior cavity of the handle and adjacent to the elastic element, the motion rod having a unitary and monolithic structure and having an exposed end protruding out of the elongate handle at the distal end, the exposed end having a tip with a tool attachment feature.

2. The cleaning implement of claim 1, wherein the elongate handle is a circular tube.

3. The cleaning implement of claim 2, wherein the motion rod is a circular tube.

4. The cleaning implement of claim 1, wherein the elongate handle has a diameter of from 1.2 cm to 7.62 cm.

5. The cleaning implement of claim 1, wherein the elongate handle has a length of from 45.7 cm to 101.6 cm.

6. The cleaning implement of claim 1, further comprising an end cap enclosing the interior cavity at the proximal end of the elongate handle.

7. The cleaning implement of claim 6, wherein the elastic element is coupled to the end cap.

8. The cleaning implement of claim 6, wherein the cleaning implement consists of the elongate handle, the end cap, the elastic element, the motion rod, and an optional label.

9. The cleaning implement of claim 1, wherein the elastic element is a member selected from the group consisting of a spring, a pneumatic piston, a hydraulic piston, an elastomer, and combinations thereof.

10. The cleaning implement of claim 1, wherein the elastic element is an elastically compressible element.

11. The cleaning implement of claim 1, wherein the elastic element is an elastically extensible element.

12. The cleaning implement of claim 1, further comprising a guide washer coupled to the elongate handle at the distal end and oriented to space the motion rod and the elongate handle from one another proximate the distal end.

13. The cleaning implement of claim 12, wherein the motion rod has a fit tolerance within guide washer of from 0.005 mm to 0.1 mm.

14. The cleaning implement of claim 1, wherein the motion rod has a length of from cm 45.7 cm to 101.6 mm.

15. The cleaning implement of claim 1, wherein the motion rod is coupled to the elastic element.

16. The cleaning implement of claim 1, wherein the tool attachment feature is a feature selected from the group consisting of a threaded feature, a cam-lock feature, a locking detent feature, and combinations thereof.

17. The cleaning implement of claim 1, wherein the tool attachment feature is a quick-release attachment feature.

18. The cleaning implement of claim 17, wherein the quick-release attachment feature is a feature selected from the group consisting of a spring-loaded ball, a spring-loaded pin, a spring-loaded ring, a retractable sleeve, a button, and combinations thereof.

19. The cleaning implement of claim 1, further comprising a tool operatively coupled to the cleaning implement via the tool attachment feature of the tip.

20. The cleaning implement of claim 19, wherein the tool is a member selected from the group consisting of a broom, a brush, a squeegee, a scraper, a rake, and combinations thereof.

21. The cleaning implement of claim 1, wherein the cleaning implement consists essentially of the elongate handle, an end cap, a single elastic element, the motion rod, a tool attachment feature, and a tool.

22. A cleaning implement, consisting essentially of:
    an elongate handle having a proximal end, a distal end, and an interior surface, the interior surface defining an interior cavity;
    a single elastic element secured within the interior cavity of the handle at the proximal end of the handle;
    an end cap enclosing the interior cavity at the proximal end of the elongate handle;
    a motion rod concentrically secured within the interior cavity of the handle and adjacent to the elastic element, the motion rod having an exposed end protruding out of the elongate handle at the distal end, the exposed end having a tip with a tool attachment feature; and
    a tool operatively coupled to the cleaning implement via the tool attachment feature of the tip.

23. The cleaning implement of claim 22, wherein the tool is a member selected from the group consisting of a broom, a brush, a squeegee, a scraper, and a rake.

* * * * *